United States Patent
Amelio et al.

[11] 3,758,053
[45] Sept. 11, 1973

[54] DUAL INPUT CABLE

[75] Inventors: Armand Francis Amelio, Yonkers, N.Y.; Daniel J. Naples, Milford, Conn.

[73] Assignee: United Aircraft Corporation, East Hartford, Conn.

[22] Filed: Sept. 16, 1971

[21] Appl. No.: 181,138

[52] U.S. Cl............ 244/83 R, 74/501 R, 244/17.13
[51] Int. Cl. ............................................. B64c 19/00
[58] Field of Search..................... 244/17.11, 17.13, 244/17.19, 17.25, 83 R, 75 R, 84; 416/25, 26, 27; 74/471 R, 479 R, 480 R, 480 B, 501 R, 501 P

[56] References Cited
UNITED STATES PATENTS

| 2,664,958 | 1/1954 | Dancik | 416/25 |
|---|---|---|---|
| 2,913,922 | 11/1959 | Harker et al. | 74/501 |
| 2,987,935 | 6/1961 | Amelio | 74/480 R |
| 3,261,405 | 7/1966 | Andrews | 416/27 |

FOREIGN PATENTS OR APPLICATIONS

| 702,348 | 2/1941 | Germany | 74/501 |

*Primary Examiner*—Milton Buchler
*Assistant Examiner*—Barry L. Kelmachter
*Attorney*—Russell M. Lipes, Jr.

[57] ABSTRACT

Control system for a helicopter which includes a cable arrangement in which a core wire connects the pilot's engine speed control lever and the engine fuel control and a sheath surrounding the core wire is connected to the collective pitch stick so that collective pitch inputs can bias fuel flow and with a connection for deactivating the collective pitch input at ground idle operation.

3 Claims, 3 Drawing Figures

PATENTED SEP 11 1973 3,758,053

INVENTORS
ARMAND F. AMELIO
DANIEL J. NAPLES

BY *Russell M. Lipes, Jr.*
ATTORNEY

DUAL INPUT CABLE

BACKGROUND OF THE INVENTION

1. Field of the Invention

This invention relates to an engine control system for a helicopter and more particularly to a collective pitch input to the fuel control to provide a decrease in transient droop during flight operation.

2. Description of the Prior Art

Control devices have employed a bowden type cable structure in which the core wire and the sheath are movable relative to each other so as to provide separate control inputs to a device such as a fuel control. The basic principle of these arrangements has been a bowed mounting of the cable with the imparting of axial movement to the core wire as one control input, and axial movement of a relatively free end of the sheath being another control input, each input resulting in separate actuation of the controlled device. For example, U.S. Pat. Nos. 2,480,083; 2,847,872 and 2,913,922 disclose control devices employing a bowden cable, and U.S. Pat. No. 2,761,635 shows the use of such a cable in a helicopter control system.

In the aircraft engine/fuel control field the conditions known as steady state and transient droop are experienced when an increased power demand is made of the engine. The magnitude of the steady state droop is dependent on the total change in power demand, while transient droop is dependent on the input rate for the power change. In the operation of a helicopter, the helicopter engine may experience a steady state or transient droop when a collective pitch change is made to the rotor which will increase the engine load, unless a fuel control adjustment is simultaneously made to maintain the previously selected engine speed at the new power condition of the engine. There is a need, therefore, for a control system which will provide an anticipation of the increased load requirement and will increase fuel flow so as to eliminate these droop conditions. There is also a need for this system to provide such compensation only under flight operation or selective conditions.

SUMMARY OF THE INVENTION

An object of the present invention is to provide an improved helicopter engine control system.

Another object of the invention is to provide a helicopter engine control system which has a collective stick input signal to the fuel control so as to provide load anticipation and modulation, therefore a decrease in droop.

Still another object of the present invention is to provide a helicopter engine control system having a collective pitch input signal to the fuel control which is selectively operational and which is inactivated at certain engine speed control lever positions.

In accordance with the present invention, a bowden cable connection comprising a core wire and a sheath is employed between the pilot's speed control lever and the engine fuel control. The cable connection is mounted with a curved or bowed portion and one end of the sheath is fixed and the other end operatively connected to the collective pitch stick so as to receive collective pitch inputs and thus provide a secondary actuation of the fuel control. A connection also is provided for restraining motion of the relatively free end of the sheath and eliminating the effect of movement of the collective pitch stick when the speed control lever is in its stop or ground idle positions. Provision is also made to provide relief in the system for the instance where the engine speed control is at its full open position and an increased collective input is made.

The foregoing and other objects, features and advantages of the invention become more apparent in the light of the following detailed description of preferred embodiments thereof, as illustrated in the accompanying drawing.

DESCRIPTION OF A PREFERRED EMBODIMENT

Figure 1:
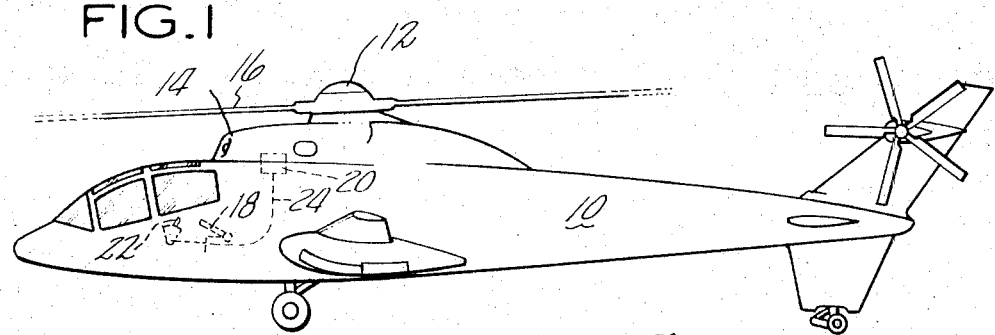
FIG. 1 is a simplified schematic drawing of a helicopter showing the approximate location of relevant control connections.

Referring to FIG. 1, helicopter 10 is shown which has a rotor 12 driven by one or more engines, not shown, within compartment 14. The rotor has a plurality of blades 16, the pitch of which can be adjusted. Controls for the helicopter comprise normal helicopter controls including collective pitch stick 18 which is operatively connected to rotor blades 16 and which is also connected to engine fuel control 20 as will be explained below. Pilot operated engine speed control lever 22 is connected to fuel control 20 by means of connection 24, in this instance the connection being a bowden cable arrangement.

Figure 2:
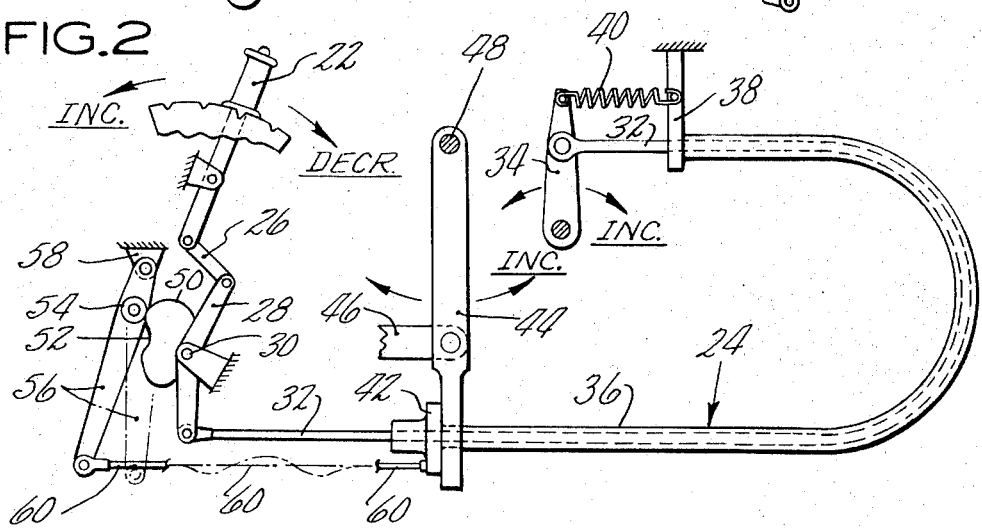
FIG. 2 is a schematic of the speed control lever-collective pitch connection to the fuel control.

FIG. 2 shows the speed control lever-collective pitch stick input connection to the engine fuel control in detail. Engine speed control lever 22 is connected by link 26 and crank 28, which rotates about pivot 30, to one end of wire 32 which is part of connection 24. The other end of wire 32 is connected to arm 34 on engine fuel control 20. Wire 32 is surrounded by sheath 36 and the wire-sheath combination is arranged in a curved or bowed manner as shown with one end of the sheath being fixedly secured to bracket 38. Spring 40 mounted between fuel control arm 34 and bracket 38 tends to rotate fuel control arm 34 in a clockwise direction. The other end of sheath 36 is relatively free to move and includes an abutment 42 which is a part thereof. The abutment is adapted to be engaged by rotatable and slotted link 44 which is connected by link 46 to collective pitch stick 18 which, in addition to varying the pitch of rotor blades 16, also rotates link 44 about pivot 48.

Cam 50 is fixedly secured to crank 28 and rotates about pivot 30 upon movement of the crank resulting from movement of speed control lever 22. The surface of the cam has a detent type recess 52 thereon. The cam surface is engaged by roller 54 mounted on link 56 which is rotatably connected at one end to fixed pivot 58. The opposite end of link 56 is connected by means of cable 60 to sheath abutment 42. Movement of speed control lever 22 rotates crank 28 to move wire 32 and rotate fuel control arm 34 and vary fuel flow to the helicopter engine accordingly to maintain an engine speed. Movement of the speed control lever in a clockwise direction results in movement of wire 32 to rotate arm 34 in a counterclockwise direction and decrease fuel flow, and movement of the speed control lever in a counterclockwise direction results in clockwise movement of arm 34 to increase fuel flow.

When speed control lever 22 is in a counterclockwise or increased fuel flow position beyond stop and idle positions, cam 50 has been rotated so that roller 54 is engaging the detent type recess 52 on the cam, permitting counterclockwise rotation of link 56 and resulting in slack in cable 60 between the lever and sheath abutment 42. The position of fuel control lever 34 is normally then a function of the position of the speed control lever. Upon a signal from collective pitch stick 18 to increase collective pitch and thus the load upon the helicopter engine, link 44 is rotated in a counterclockwise direction in accordance with upward collective pitch stick movement. As the lower end of link 44 moves away from abutment 42, the tension in spring 40 is reflected in wire 32 and, because of the fixed position of sheath 36 at bracket 38 and the bowed but unrestrained form of connection 24, the sheath will tend to move to the right in the drawing. This in turn will cause the end of wire 32 connected to arm 34 to move to the right, rotating arm 34 in a clockwise direction to increase fuel flow to the engine in accordance with the change in position of link 44.

Thus, a collective pitch change which imposes a loading on the engine will, at the same time, increase engine fuel flow to overcome a tendency of engine speed to decrease during the transient condition and to maintain the original engine speed output under the new load condition. When speed control lever 22 is in its stop or idle positions, that is when it is in the last two clockwise positions, the higher surface of cam 50 rotates link 56 in a clockwise direction to tighten cable 60. In those positions, such as when the helicopter pilot is operating the helicopter on the ground and checking out the controls, a collective pitch input resulting in movement of link 44 in a counterclockwise direction will not result in movement of abutment 42 and sheath 36 because movement of the abutment is restrained by cable 60. No change in fuel flow would occur during ground check-out from the fact of a collective pitch stick input.

Figure 3:
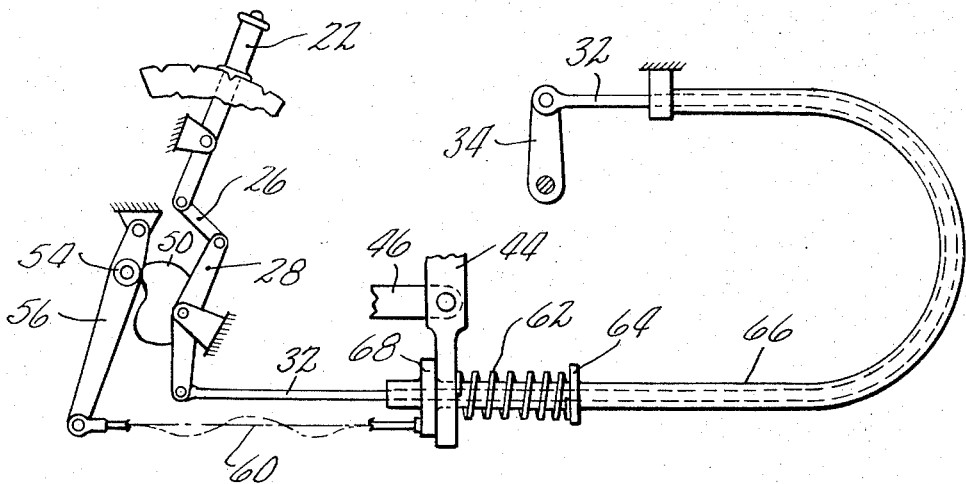
FIG. 3 is an alternate dual-input cable arrangement.

FIG. 3 illustrates an alternative cable arrangement. In this arrangement, speed control lever 22 is connected to wire 32 by a linkage corresponding to that of FIG. 2. The difference in the arrangements is in the location of spring 62 between the lower end of rotatable link 44 and shoulder 64 on sheath 66 rather than being located as is spring 40 in the arrangement shown in FIG. 2. Rotation of link 44 against spring 62 will result in motion of sheath 66 and motion of the end of wire 32 connected to fuel control arm 34 to provide a change in fuel flow when collective pitch is increased. Abutment 68, attached to the relatively free end of sheath 66 is connected by cable 60 to link 56 to prevent sheath movement during idle operation as described relative to the FIG. 2 embodiment.

Since the total input of the combined speed control lever (when at a full increase position) and a collective pitch input may add up to more than 100 percent travel of fuel control arm 34, an override is provided by the slide drive of collective input link 44 and the springs 40 of FIG. 2 or 62 of FIG. 3. In FIG. 2 when arm 34 is in full increase (clockwise) position, spring 40 is compressed and link 44, in moving counterclockwise due to an increase in collective pitch input, will separate from abutment 42 without resulting movement of wire 32 and sheath 36. In FIG. 3, in a similar manner, when arm 34 is in full increase (clockwise) position spring 62 is compressed as link 44 rotates counterclockwise due to an increase in the collective pitch control without resulting movement of wire 32 and sheath 36.

Although the invention has been shown and described with respect to preferred embodiments thereof, it should be understood by those skilled in the art that the foregoing and other changes and omissions in the form and detail thereof may be made therein without departing from the spirit and scope of the invention, which is to be limited and defined only as set forth in the following claims.

We claim:

1. A control system for a helicopter;
said helicopter including an engine, a fuel metering device for the engine, and pilot operated controls including an engine speed control lever and a collective pitch stick;
said control lever having operational positions including ground idle and flight;
connecting means between said control lever and said metering device having a portion thereof mounted in a bent form;
said connecting means including one element connecting said control lever and said metering device to vary engine speed;
a second element for said connecting means having one end relatively fixed and a portion capable of movement with respect to said one element;
means for moving said portion of said second element;
means connecting said collective pitch stick and said moving means for varying engine speed independently of said control lever; and
means limiting movement of said portion of said second element when said control lever is in ground idle position.

2. A fuel control for a helicopter having a connection with engine speed control means and a collective pitch stick;
said connection including a wire encased in a sheath with said connection being mounted in a bowed arrangement;
said speed control means being linked directly to said fuel control by said wire;
said sheath having one end fixed against movement;
means for shifting the position of the other end of said sheath in accordance with movement of said collective pitch stick; and
means activated by said speed control means for limiting position shifting of said sheath other end in certain positions of said speed control means.

3. A fuel control for a helicopter having a connection with engine speed control means and a collective pitch stick;
said connection including a wire encased in a sheath with said connection being mounted in a bowed arrangement;
means linking said speed control means to said wire and to said fuel control;
said sheath having an end fixed against movement;
means for shifting the position of the other end of said sheath in accordance with movement of said collective pitch stick;
cam means operatively associated with said speed control linking means;
lever means actuated by said cam means;
abutting means on said other end of said sheath; and
means connecting said lever means and said abutting means to limit shifting of said abutting means in certain positions of said speed control means.

* * * * *